United States Patent [19]

Pritchard et al.

[11] Patent Number: 4,696,954
[45] Date of Patent: Sep. 29, 1987

[54] THERMALLY STABLE AND HIGH IMPACT RESISTANT STRUCTURAL POLYURETHANE FOAM

[75] Inventors: James R. Pritchard; Dale F. Regelman, both of Wallingford, Conn.

[73] Assignee: The Dow Chemical Company, Midland, Mich.

[21] Appl. No.: 854,968

[22] Filed: Apr. 23, 1986

[51] Int. Cl.$^4$ .................. C08G 18/00; C08G 18/14
[52] U.S. Cl. .................. 521/167; 521/163; 521/164
[58] Field of Search .................. 521/163, 164, 167

[56] References Cited

U.S. PATENT DOCUMENTS

| | | | |
|---|---|---|---|
| 3,655,597 | 4/1972 | Strassel | 521/51 |
| 3,836,424 | 9/1974 | Reymore et al. | 161/159 |
| 4,247,677 | 1/1981 | Schmidt et al. | 521/163 |
| 4,263,408 | 4/1981 | Meyborg et al. | 521/51 |
| 4,292,411 | 9/1981 | Jourquin et al. | 521/51 |
| 4,474,901 | 10/1984 | Dominguez | 521/163 |
| 4,495,081 | 1/1985 | Vanderhider et al. | 252/182 |
| 4,530,941 | 7/1985 | Turner et al. | 521/176 |

Primary Examiner—John Kight
Assistant Examiner—Dennis R. Daley
Attorney, Agent, or Firm—J. S. Rose

[57] ABSTRACT

Molded cellular polymers are disclosed which are derived from the reaction of organic polyisocyanates with novel active hydrogen compositions comprising (A) a polyester polyol mixture derived from (i) an aromatic polycarboxylic compound containing two or more carboxylic groups; and (ii) an excess of at least one polyol having from 2 to 8 hydroxyl groups and an equivalent weight of from about 30 to about 250; and (B) from about 5 to about 30 percent by weight of a primary or secondary amine terminated polyether of greater than 1500 molecular weight and amine functionality of from about 2 to about 8.

The molded products are characterized by a combination of excellent impact strength and resistance to high temperatures as well as good resistance to burning.

20 Claims, No Drawings

4,696,954

THERMALLY STABLE AND HIGH IMPACT RESISTANT STRUCTURAL POLYURETHANE FOAM

FIELD OF THE INVENTION

This invention relates to the preparation of polymer foams and is more particularly concerned with molded polyurethane foams characterized by high impact strength and good thermal stability.

DESCRIPTION OF THE PRIOR ART

Molded cellular polymers having polyurethane or polyurethane-polyisocyanurate linkages are well known and have been commercially available for a considerable period of time. For example, U.S. Pat No. 3,655,597 disclosed molded polyurethanes having compact skins by reacting together organic polyisocyanates, polyols, non-aqueous blowing agents, a diamine and a catalyst. U.S. Pat. No. 3,836,424 disclosed molded polyisocyanurate foam articles having skins with improved impact resistance.

More recently molded cellular polymers have been prepared by the reaction injection molding (RIM) process. U.S. Pat. No. 4,292,411 discloses an improvement which consists of the use of a catalyst combination of organic initiators containing at least one primary or secondary amine with an organic bismuth compound. Included in the initiators are a class of polyoxypropylenediamines of molecular weight up to 1000. Disclosed as a general class of polyols are those polyester polyols having at least 2 hydroxyl groups and being prepared from polycarboxylic acids and excess of low molecular weight polyols.

U.S. Pat. No. 4,263,408 discloses molded cellular foams prepared from aliphatic or alicyclic polyisocyanates combined with specific types of catalyst combinations. These molded products are characterized by good resistance to weathering and being non-yellowing.

Most recently U.S. Pat. No. 4,530,941 has disclosed the preparation of a wide variety of types of molded foams including polyurethane and polyurethane-polyisocyanurate molded products wherein part or all of the polyol portion of the ingredients is replaced by aminated polyethers of relatively high molecular weight. Molded structural foam products when prepared in accordance with the disclosed method, using high levels of extenders, can have excellent impact strengths but a fall-off in heat stability occurs.

It has now been discovered that through the use of a certain type of polyester polyol mixture in combination with certain aminated polyethers, molded cellular polyurethanes can be prepared with improved impact strengths while at the same time suffering from little, if any, fall-off in heat resistance.

SUMMARY OF THE INVENTION

This invention comprises a molded cellular polymer which comprises the reaction product obtained by bringing together in the presence of a blowing agent and a urethane-forming catalyst, an organic polyisocyanate, a polyol, and extender wherein the improvement comprises employing as said polyol and extender an active hydrogen composition comprising:

A. a polyester polyol mixture derived from the reaction of, (i) an aromatic polycarboxylic compound containing two or more carboxylic groups; and
(ii) an excess of at least one polyol having from 2 to 8 hydroxyl groups and an equivalent weight of from about 30 to about 250; and B. a primary or secondary amine terminated polyether of greater than 1500 molecular weight and amine functionality of from about 2 to about 8 wherein greater than 50 percent of the active hydrogens are in the form of amine hydrogens, said polyether being present in sufficient proportions to provide for improved impact strength with retention of heat resistance of said molded polymer.

This invention also comprises an active hydrogen composition comprising (A) the polyester polyol mixture defined above and (B) from about 5 to about 30 percent by weight based on the combined weight of (A) and (B) of the primary or secondary amine terminated polyether defined above.

This invention also comprises the above defined active hydrogen composition comprising additionally from about 1 to about 30 percent by weight of a fluorocarbon blowing agent.

DETAILED DESCRIPTION OF THE INVENTION

The improved molded cellular polymers of the invention can be prepared using any of the conventional molding techniques employed in the polyurethane art. The novelty of the present products resides in the use of particular active hydrogen compositions defined above and which compositions themselves form part of the present invention. Although any of the known molding techniques can be employed, it is the reaction injection molding (RIM) method which is particularly preferred. The molding methods and procedures disclosed in the U.S. Pat. Nos. 3,655,597, 3,836,424, 4,292,411, 4,263,408 and 4,530,941 cited supra along with their general teaching in respect of polyurethanes and polyisocyanurates and the ingredients employed are hereby incorporated herein by reference.

When the active hydrogen compositions are reacted with organic polyisocyanates in accordance with the invention, the molded cellular foam bodies obtained have high impact strengths. Surprisingly, and, in contrast to the prior art, there is little or no loss in their resistance to high temperatures as measured by heat deflection temperature in accordance with ASTM Test Method D648.

Additionally, the active hydrogen compositions provide stable homogeneous blends (commonly known as a "B side") which maintain their homogeneity during storage or in dispensing through equipment such as the high pressure heads and auxiliary equipment routinely employed in RIM processing. This homogeneity is maintained notwithstanding the presence of low molecular weight glycol ingredients.

Further, the stable blends have excellent miscibility with fluorocarbon blowing agents over the entire range of proportions required for any desired density. This attribute allows for the preparation of the present molded bodies using a two component system wherein the A side comprises the polyisocyanate ingredients and the B side includes all of the remaining reactants and adjuvants.

The polyester polyol mixtures (A) of the active hydrogen compositions are obtained by the reaction of an excess (as hereinafter defined) of at least one polyol as defined above with an aromatic polycarboxylic compound containing 2 or more carboxylic groups under normal esterification conditions well known in the art.

The aromatic polycarboxylic compounds employed preferably contain from two to three carboxylic groups either in the form of the free acids or the corresponding anhydrides thereof, where appropriate. The term "aromatic" means an aromatic nucleus having from 6 to 12 carbon atoms and is inclusive of benzene, toluene, xylene, naphthalene, and nucleii containing two benzene rings including those compounds wherein the aromatic rings are additionally substituted by one or more halo groups (fluorine, chlorine, bromine and iodine, particularly chlorine and bromine) and one or more inert substituents such as $C_1$ to $C_4$ alkyl, and the like.

Illustrative of the aromatic polycarboxylic compounds but not limiting thereof are isophthalic acid, terephthalic acid, phthalic acid and the anhydride thereof, halogen substituted phthalic such as 3 or 4-chloro-, bromo-, and iodo-phthalic, tetrachlorophthalic, tetrabromophthalic acids and the anhydrides thereof and the like, 3,4-toluenedicarboxylic acid and the anhydride thereof, 1,5-naphthalenedicarboxylic acid, 4,4'-dicarboxydiphenyl, 4,4'-dicarboxydiphenylsulfone, 4,4'-dicarboxybenzophenone, 4,4'-dicarboxydiphenyl ether, 4,4'-dicarboxydiphenylmethane, trimelletic acid and the anhydride thereof, hemimelletic acid and the anhydride thereof, and trimesic acid.

A preferred group of polycarboxylic compounds consists of phthalic, isophthalic, terephthalic, and trimellitic acids and the anhydrides where appropriate and the halogenated phthalic acids set forth above. A particularly preferred group consists of phthalic (anhydride thereof), iso-, and terephthalic acids.

The at least one polyol employed in the esterification process, preferably has an hydroxyl functionality of 2 to 4 and an equivalent weight of from about 30 to about 150, most preferably from about 30 to about 100. Although a single polyol can be employed in excess in the esterification process, it is preferred to use a combination of two or more different low equivalent weight polyols. No particular functionalty or equivalent weight requirements need be met in the choice of which polyols to combine, simply that they meet the limitations of functionality and equivalent weight ranges set forth above.

Typical of the polyols which can be employed are ethylene glycol, diethylene glycol, triethylene glycol, propylene glycol, dipropylene glycol, tripropylene glycol, 1,4-butanediol, 1,6-hexanediol, neopentyl glycol, dibromoneopentyl glycol, glycerine, triols prepared from glycerine with 1 to 10 molar proportions of ethylene or propylene oxide, trimethylolpropane, pentaerythritol, the polyethyleneoxy glycols such as Carbowax 200 and 400 (supplied by Union Carbide Corp.) and similar polypropyleneoxy glycols, butenediol, cyclohexanediol, bisphenol A, methylglucoside, sorbitol, mannitol, and the like.

A preferred group of polyols comprise ethylene glycol, diethylene glycol, propylene glycol, dipropylene glycol, glycerine, and the triols prepared from glycerine with 1 to 10 molar proportions of ethylene or propylene oxide.

The term "excess" in respect of the at least one polyol means the excess of polyol or mixture thereof over and above the stoichiometric proportion of one mole of polyol designated for reaction with each carboxylic group present in the polycarboxylic compound. It will be readily apparent to one skilled in the art, that the term carboxylic group refers to the carbonyl function regardless of whether it appears as part of an anhydride or as a free carboxylic acid group. Illustratively, a difunctional polycarboxylic compound such as phthalic anhydride or its free acid calls for a stoichiometric molar requirement of polyol (regardless of functionality) to polycarboxylic compound of 2 to 1; and for a trifunctional compound such as trimellitic anhydride for a stoichiometric ratio of 3 to 1. Clearly, when more than one polyol is employed in the esterification then the sum total of all the molar proportions of polyol would be included in these ratios. Accordingly, the polyol(s) is employed in excess so that complete esterification can be effected, and, additionally, so that excess liquid polyol can be present to serve both as viscosity modifier and extender in the urethane forming reaction.

The exact amount of excess is not particularly critical other than to provide a polyester polyol mixture having both a reasonable viscosity, for example, lower than about 100,000, preferably below 50,000 cps at 25° C. and sufficient free polyol to serve as an extender. Advantageously, the excess falls within a range of from about 0.2 mole to about 3.0 moles, preferably from about 0.4 to about 2.0 per mole of polycarboxylic compound.

In carrying out the esterification between the polyol(s) and polycarboxylic compounds, standard esterification conditions and procedures are employed as described in the prior art; see for example, "Polyurethanes Chemistry and Technology", Part I, pp. 45-46, 1962, Saunders and Frisch, John Wiley & Sons; U.S. Pat. Nos. 3,459,733 and 4,540,771.

Illustratively, the esterification is conducted in the absence of solvent under a flow of nitrogen and at temperatures from about 150° C. to about 250° C., preferably from about 175° C. to about 225° C. for a period from about 5 hours to about 40 hours, preferably from about 8 hours to about 15 hours. The acid number of the product is usually from about 0.5 to about 2 and preferably is below 2. During the reaction period, water which is formed is removed overhead.

Advantageously, catalysts are employed which shorten the esterification period. Exemplary catalysts are p-toluenesulfonic acid, magnesium oxide, calcium oxide, antimony oxide, zinc oxide, lead oxide, magnesium acetate, calcium acetate, zinc acetate, lead acetate, various organic amines, sodium methoxide, potassium methoxide, sodium alkoxytitanates, tetralkyltitanates, and the like. Optionally there can be added to the polyesters, either during preparation or afterwards, preservatives, antioxidants, and other suitable adjuvants.

The polyester polyol mixtures produced in accordance with the method outlined hereinabove are characterized by hydroxyl equivalent weight values from about 85 to about 200, and preferably in the range from about 90 to about 150.

Preferably, the polyamine component (B) is a primary amine with a functionality from about 2 to about 4. Most preferably, the primary amine terminated polyethers have a functionality of about 2 to about 3 and a molecular weight falling within the range of about 2000 to about 6000. These amine terminated polyethers, are readily obtained by reductive amination of appropriate precursor polyalkyleneoxy polyols as outlined in U.S. Pat. No. 3,654,370. Generally speaking, any type of polyether polyol can be employed, but preferably, those having secondary hydroxyls are used to facilitate the amination process. In any given amination process some non-aminated polyether polyols may remain in admixture with the polyamine products. Generally speaking, the polyamine products can be considered as having greater than 50 percent of their active hydrogens in the form of amine hydrogens and for the most part greater than 80 percent amine content. That is to say, the polyamines can comprise mixtures ranging from constituents containing polyethers having 100 percent of their functionality as amine to those having greater than 50 percent amine content.

Typical polyamine terminated polyethers meeting the above requirements are commercially available from Texaco Chem. Co. under the trade names Jeffamine D-2000 (polyoxypropylene diamine, M.W.=2000), Jeffamine ED-2001 (polyoxypropylene-polyoxyethylene diamine, M.W.=2000), Jeffamine T-3000 (polyoxypropylene triamine, M.W.=3000), and Jeffamine T-5000 (polyoxypropylene triamine, M.W.=5000).

The components (A) and (B) are simply blended together using any convenient means for mixing liquid ingredients to form the active hydrogen compositions in accordance with the present invention. Generally speaking, the (B) component is employed with the (A) component in sufficient proportions so as to provide the improved impact strengths with retention of heat resistance in the molded polyurethanes. Advantageously, it is employed in the proportions of from about 5 to about 30 percent by weight, preferably, from about 8 to about 25 percent based on the combined weight of (A) and (B).

In another embodiment, the active hydrogen compositions in accordance with this invention can contain from about 1 to about 30 percent by weight of a fluorocarbon blowing agent without any separation of the fluorocarbon occurring over prolonged storage. Preferably the fluorocarbon blowing agent falls within the range of about 2 to about 10 percent by weight. The fluorocarbon blowing agents are well known to those skilled in the art and are set forth in detail in the references already incorporated herein. Illustrative but not limiting thereof are chlorotrifluoromethane, dichlorodifluoromethane, trichlorofluoromethane, methylene chloride, chloroform, and the like. A particularly preferred blowing agent for incorporation in the active hydrogen compositions is trichlorofluoromethane.

In carrying out the preparation of the molded cellular polymers in accordance with the present invention the novel active hydrogen compositions described above can be employed directly as a premixed "B side" blend for reaction with the organic polyisocyanate. Alternatively, the components of the blend, i.e. the polyester polyol mixture and the amine terminated polyether can be fed as separate streams to the reaction site. Generally speaking, it is preferable to employ a single stream for the B side containing in addition to the polyol components, the blowing agent, catalyst, and any other optional adjuvants discussed below.

Any of the organic polyisocyanates commonly employed in the art for the preparation of molded cellular polyurethanes can be employed herein. Included are those organic polyisocyanates disclosed in the incorporated references. Typically, any of the known organic di- or higher functionality aliphatic or aromatic polyisocyanates can be employed. The preferred class includes the aromatic polyisocyanates.

Illustrative, but not limiting thereof, are 1,6-hexamethylene diisocyanate, 1,4-cyclohexylene diisocyanate, 4,4'-methylenebis(cyclohexyl isocyanate), m- and p-phenylene diisocyanate, 2,4- and 2,6-toluene diisocyanate and mixtures of these two isomers, methylenebis(phenyl isocyanate) inclusive of 4,4'-methylenebis(phenyl isocyanate), 2,4'-methylenebis(phenyl isocyanate), and mixtures of these methylenebis(phenyl isocyanate) isomers, 3,3'-dimethyl-4,4'-diisocyanatodiphenyl methane; liquefied forms of methylenebis(phenyl isocyanate) particularly liquefied forms (including mixtures containing up to about 20 percent of the 2,4'-isomer) of 4,4'-methylenebis(phenyl isocyanate) such as the carbodiimide-containing 4,4'-methylenebis(phenyl isocyanates) having isocyanate equivalent weights of from about 130 to about 180 prepared for example by heating 4,4'-methylenebis(phenyl isocyanate) with a carbodiimide catalyst to convert a portion of said isocyanate to carbodiimide; and liquefied forms of 4,4'-methylenebis(phenyl isocyanate) which have been reacted with minor amounts (from about 0.04 to about 0.2 equivalent per equivalent of isocyanate) of low molecular weight glycols such as dipropylene glycol, tripropylene glycol, and mixtures thereof; isocyanate terminated prepolymers having an isocyanate content of about 9 to about 20 percent by weight prepared from methylenebis(phenyl isocyanate) and a polyol having a functionality from 2 to 3 selected from polyalkyleneoxy polyols of M.W. 1000 to 10,000, polytetramethylene glycols of M.W. 600 to 5000, and polyester polyols of M.W. 500 to 8000, said polyol and said methylenebis(phenyl isocyanate) being reacted in the proportions of about 0.01 equivalent to about 0.5 equivalent of said polyol per isocyanate equivalent; blends or mixtures of any of the above polyisocyanates and particularly mixtures of the liquefied methylenebis(phenyl isocyanates) with each other and with the isocyanate terminated prepolymers described above in any proportions desired; polymethylene poly(phenyl isocyanate) mixtures containing from about 20 percent to about 85 percent by weight (preferably about 30 to about 60 percent) of methylenebis(phenyl isocyanate), with the balance of 80 to 15 percent by weight (70 to 40 percent) of the mixtures being polymethylene poly(phenyl isocyanates) of functionality higher than 2; included in the polymethylene poly(phenyl isocyanates) are those having the 4,4'-methylenebis(phenyl isocyanate) isomer and mixtures including up to about 30 percent of the corresponding 2,4'-isomer.

Particularly preferred are the polymethylene poly(phenyl isocyanates).

The proportions in which the various reactants are employed are such that the overall ratio of equivalents of polyisocyanate to the total equivalents of active hydrogen comprised of the polyester polyol mixture (A) and amine terminated polyether (B) falls within the range of about 0.90:1 to about 1.5:1. When said ratio exceeds about 1.2:1 it is preferable that the urethane forming catalyst employed possesses additional activity as an isocyanate trimerization catalyst or that an isocyanate trimerization catalyst be employed in conjunction with the requisite urethane catalyst. Preferably, the ratio lies within the range of from about 0.95:1 to about 1.15:1.

Any of the urethane catalysts disclosed in the art supra can be employed in the present process. Such catalysts include organic and inorganic acid salts of, and organometallic derivatives of bismuth, tin, lead, antimony, cobalt, and the like, as well as phosphines and tertiary organic amines. A preferred group of such catalysts include stannous octoate, stannous oleate, dibutyltin diacetate, dibutyltin dioctoate, dibutyltin dilaurate, dibutyltin maleate, dibutyltin mercaptopropionate, dibutyltin didodecylmercaptide, dibutyltin bis(isooctylthioglycolate), and the like; triethylamine, triethylenediamine, N,N,N',N'-tetramethylethylenediamine, N-methylmorpholine, N,N-dimethylcyclohexylamine, and the like, and mixtures of the above in any combination.

Generally speaking, the catalyst or mixture of catalysts, if employed, will fall within a range of from about 0.01 percent by weight to about 5 percent by weight based on the total weight of all the ingredients.

The trimerization catalysts employed can be any catalyst known to those skilled in the art which will catalyze the trimerization of an organic isocyanate compound to form the isocyanurate moiety. For typical catalysts see the Journal of Cellular Plastics, Nov./Dec. 1975, p. 329; U.S. Pat. Nos. 3,745,133, 3,896,052, 3,899,443, 3,903,018, 3,954,684, and 4,101,465, the disclosures of these U.S. patent references being hereby incorporated herein by reference.

As previously discussed the fluorocarbon blowing agents can be employed in the proportions set forth above as part of the B side in accordance with the compositions of the invention. Alternatively, the fluorocarbon may be added separately to the reaction ingredients in such proportions that the resultant molded polymer's specific gravity falls within a range of about 0.4 to about 1.2, preferably about 0.7 to about 1.0. Optionally, other blowing agents can be employed in conjunction with the fluorocarbon, such agents being minor proportions of water to form carbon dioxide and polyurea linkages, inert gases (e.g. nitrogen, argon) and the like.

Other optional additives can be employed either as separate streams or dissolved in the B side. Typical of such additional components are cell stabilizers, surfactants, internal mold release agents, flame retardants, colorants, reinforcing agents, fiberglass, organic fibers, fillers, and the like, according to the teachings of the incorporated references. A preferred class of flame retardant additives are the phosphorus containing flame retardants including those having active hydrogen reactivity (hydroxyl and amine groups) such as dibromoneopentyl glycol, tris(2-chloroethyl)phosphate, tris(2-chloropropyl)phosphate, tris(2,3-dibromopropyl)phosphate, tri(1,3-dichloroisopropyl)phosphate, and the like.

The molded products in accordance with the present invention are characterized by high and increased impact strengths proportionate to the level of the aminated polyether component (B). Unexpectedly, this increased impact strength is gained with little or no loss in the heat resistance of the molded products as measured by heat deflection temperatures according to ASTM Test Method D648. Contrastingly, when known prior art impact modifying polyols are used in place of the aminated polyethers, the result is the expected increase in impact strength but unfortunately at a loss of heat resistance for the molded products (see Example 1 below).

In a further advantage to flow from the present invention the molded products can be readily formulated with fire retardants to achieve at least a V-1 rating and in most cases a V-0 rating when tested by the UL-94 vertical burn test defined below in Example 1.

Furthermore, the molded products are tough materials having flexural modulus values well in excess of 200,000 psi.

Because of the combination of properties described above, the molded cellular polymers of this invention are particularly useful in the preparation of cabinet housings in the electrical industry, computer hardware, technical instrumentation, medical instrumentation, and the like; in ski cores, office furniture, window framing, and any housing or cabinet application calling for a UL-94 V-0 rating with high strength and resistance to heat which may be generated by the cabinet contents.

The following examples describe the manner and process of making and using the invention and set forth the best mode contemplated by the inventors of carrying out the invention but are not to be construed as limiting.

EXAMPLE 1

This example sets forth two molded cellular foams in accordance with the present invention (Foams A and B) along with molded Comparison Foams (CF1 to CF6) using the ingredients in the proportions of parts by weight set forth in Table I.

The foams were prepared using a bench-scale preparation wherein the component A comprising the polyisocyanate (at 68° F.) was mixed with component B also at 68° F. and comprising the ingredients set forth in Table I in a quart cup. The reactants were rapidly stirred using an agitator driven at high speed (2400 RPM) for a 5 second period and then immediately poured into an 8"×8"×0.25" clam-shell aluminum mold at 150° F. The demold time was 2 ½ minutes with no post-curing and the samples were tested for the properties set forth in Table I.

The Polyester Polyol I employed was prepared illustratively as follows: A 12 liter resin flask equipped with an overhead stirrer, thermometer, nitrogen sparge, distillation head and condenser was charged with 920 g. (10 moles) of glycerol, 2230 g. (16.64 moles) of dipropylene glycol followed by 1660 g. (10 moles) of terephthalic acid and 2.88 g. (0.06 percent by weight of total ingredients) of an esterification catalyst Fascat 4100 (supplied by M & T Chemicals). The mixture was heated slowly and after a total time of 9 to 12 hours the solution temperature had reached about 205° C. with the theoretical amount of formed water having been collected; Eq. wt.=103; viscosity=10,000 cps. (25° C.); acid #=0.87; % by wt. free dipropylene glycol=28%; % by wt. free glycerine=8%.

Foam A which contained about 9 percent by weight of the polypropyleneoxy triamine based on its combined weight with polyester polyol was characterized by excellent impact strength, heat deflection temperature and UL-V-0 rating set forth in Table I. When the polypropyleneoxy triamine was raised to about 23 percent by weight in Foam B the impact strength was raised further with retention of HDT at a high level and a reduction of fire resistance to a V-1 rating.

Comparatively, CF1 with no polypropyleneoxy triamine, while having UL-94 and HDT properties comparable to Foam A, had an impact strength much inferior. When a known impact improving polyol such as the A-1228 was added in CF2 and CF3 at comparable levels to the triamine in A and B respectively, the impact strengths improved but the HDT values decreased particularly at the 23 percent by weight level in CF3. This same fall-off in HDT values was observed in the series CF4 to CF6 when another impact improving polyol was studied. As the impact strengths were improved in CF5 and CF6 over CF4, the HDT values decreased.

TABLE I

| Ingredients (pts. by wt.) | Foams | | | | | | | |
|---|---|---|---|---|---|---|---|---|
| | A | B | CF1 | CF2 | CF3 | CF4 | CF5 | CF6 |
| Component A: | | | | | | | | |
| Polyisocyanate I[1] | 71.4 | 72.2 | 70.9 | 71.3 | 72.0 | 82.6 | 83.4 | 84.8 |
| Component B: | | | | | | | | |
| Polyester Polyol I[2] | 50 | 50 | 50 | 50 | 50 | 50 | 50 | 50 |
| T-5000[3] | 5 | 15 | — | — | — | — | — | — |
| A-1228[4] | — | — | — | 5 | 15 | — | 5 | 15 |
| EPD-56[5] | — | — | — | — | — | — | — | — |
| DE-60F[6] | 15 | 15 | 15 | 15 | 15 | 10 | 10 | 10 |
| FR-2000[7] | — | — | — | — | — | 6 | 6 | 6 |
| Tris(2-chloroethyl)-phosphate | — | — | — | — | — | — | — | — |
| DC-193[8] | 1.0 | 1.0 | 1.0 | 1.0 | 1.0 | 1.0 | 1.0 | 1.0 |
| Polycat 32[9] | 1.1 | 1.1 | 1.1 | 1.1 | 1.1 | 2 | 2 | 2 |
| Freon-11 | 2.0 | 2.0 | 2.0 | 2.0 | 2.0 | 3 | 3 | 3 |
| Properties | | | | | | | | |
| Density (g/cc) | 0.90 | 0.85 | 0.88 | 0.78 | 0.79 | — | — | — |
| Flexural Modulus[10] (kpsi) | 287.8 | 211.4 | 303.4 | 221.1 | 191.2 | — | — | — |
| Flexural Strength[10] (psi) | 9991 | 7305 | 8810 | 7080 | 6410 | — | — | — |
| Charpy Impact[11] ft-lbs/in$^2$ | 8.07 | 10.76 | 3.26 | 7.50 | 9.24 | 3.26 | 7.04 | 7.75 |
| HDT (°C.)[12] 66 psi | 97 | 88 | 94 | 90 | 73 | 94 | 76 | 65 |
| UL-94[13] | V-0 | V-1 | V-0 | V-0 | V-1 | — | — | — |

Footnotes to Table I:
[1] Polyisocyanate I: A polymethylene poly(phenyl isocyanate) containing about 40 percent by weight of methylenebis-(phenyl isocyanate) the balance having a functionality higher than 2; I.E. = about 133.
[2] Polyester Polyol I: Hydroxyl Eq. wt. = about 103; contains about 8 percent by weight glycerine and about 28 percent by weight dipropylene glycol.
[3] T-5000: A polypropyleneoxy triamine of about 500 molecular weight supplied by Texaco Chemical Co.
[4] A-1228: A 6000 molecular weight polypropyleneoxy-polyethyleneoxy triol; OH E.W. = about 2000; about 14 to 16 percent ethyleneoxy composition; supplied by Witco Chemical Co.
[5] EPD-56: A 2000 molecular weight polypropyleneoxy-polyethyleneoxy diol; OH E.W. = about 1000; supplied by Witco Chemical Co.
[6] DE-60F: A solution of about 85 percent by weight of pentabromodiphenyl oxide dissolved in a polyphosphate ester; supplied by Great Lakes Chemical Co.
[7] FR-2000: A sucrose based polyol containing ~30 percent by weight dibromoneopentyl glycol; OH E.W. = 125.
[8] DC-193: A silicone surfactant supplied by Dow Corning Corporation.
[9] Polycat 32: A tertiary amine catalyst comprising a mixture of dimethylamino-cyclohexylamine and N—methyldicyclohexylamine; supplied by Abbott Laboratories.
[10] Flexural properties measured in accordance with ASTM Test method D-790.
[11] Charpy Impact: Impact resistance test measured in accordance with ASTM Test Method D-256.
[12] HDT: Heat deflection temperature measured in accordance with ASTM Test Method D-648.
[13] UL-94: UL-94-V0 is the highest rating for non-burning of plastics when tested in the UL-94 vertical burn test in accordance with the test method described by Underwriters Laboratories, Inc., Northbrook, Illinois. The test specimen measures 5" × ½" × 1/16" thickness. Specimens are conditioned by storage for 48 hours at 23° C. and 50% relative humidity followed by 168 hours at 70° C. then cooled in a desiccator prior to testing. The specimen is clamped by one end so that it hangs vertically in a draft-free chamber with the lower end suspended 12" above a 2 square inch thin layer of cotton. A ¾" blue flame of a bunsen burner is held for 10 seconds under the sample then removed and flame duration noted. The flame is placed again for another 10 second period. Specimens are tested in sets of five for each blend. Test observations include duration of flame after first and second flame application, whether sample burns up to the clamp, particularly whether specmen drips flaming particles to ignite the cotton. To achieve UL-94-V0 the specimen must not burn more than 10 seconds after either flame application; total combustion time not to exceed 50 seconds for all 10 applications (5 specimens × 2 flame applications each); no burning up to clamp; no flaming drip or cotton ignition; specimen glow time no more than 30 seconds after removal of second flame.

EXAMPLE 2

This example sets forth four molded cellular foams C to F, inclusive, in accordance with present invention using the ingredients in the proportions of parts by weight set forth in Table II.

The molded foams were prepared using an Admiral Equipment Company (division of The Dow Chemical Co.) 2000 HP RIM machine and employing two reactant streams. Stream (component) A was the Polyisocyanate I at about 95° F. while stream (component) B comprised the ingredients noted in Table II at a temperature of about 100° F. The components were mixed at about 2000 psi in the high pressure impingement mixing head and discharged into a 10"×18"×0.25" closed aluminum mold at about 150° F. The demold time was about 2½ minutes with no post curing.

The Polyester Polyol I prepared according to Example 1 above was employed in Foams C, D, and E, whereas Foam F employed the Polyester Polyol II. This latter polyol was prepared similarly to Polyol I using the same procedure but the reactants of terephthalic acid, glycerol, dipropylene glycol, and the triol prepared from the reaction of glycerol with propylene oxide in the molar proportions of 1 to 3, respectively. The molar proportions of these ingredients were 1.0:0.8:1.73:0.2, respectively. The resultant polyol mixture had a hydroxyl eq. wt.=about 106; viscosity 19,000 cps. (25° C.); and acid #=0.2.

Foams C through F are all possessed of very high impact strengths combined with excellent resistance to heat as measured by HDT values as set forth in Table II.

TABLE II

| Ingredients (pt. by wt.) | Foams C | D | E | F |
| --- | --- | --- | --- | --- |
| Components A: | | | | |
| Polyisocyanate I | 72.0 | 72.6 | 83.0 | 70.0 |
| Component B: | | | | |
| Polyester Polyol I | 50 | 50 | 50 | — |
| Polyester Polyol II | — | — | — | 50 |
| T-5000 | 5 | 15 | 5 | 5 |
| DE-60F | 15 | 15 | — | 15 |
| FR-2000 | — | — | 10 | — |
| Tris(2-chloroethyl)phosphate | — | — | 6 | — |
| DC-197[1] | 1 | 1 | — | — |
| DC-193 | — | — | 1 | 1 |
| Polycat 32 | 1 | 1 | 2 | 1.5 |
| Freon-11 | 1.5 | 1.5 | 3 | 1.5 |
| Properties | | | | |
| Density (g/cc) | — | — | 0.85 | — |
| Flexural Modulus (kpsi) | 285.6 | 259 | — | 232.7 |
| Flexural Strength (psi) | 9856 | 7663 | — | 10,127 |
| Tensile Strength (psi) | 5400 | 4405 | — | 5400 |
| Charpy Impact, ft-lbs/in² | 15.1 | 20.7 | 13.65 | 14.0 |
| HDT (°C.), | | | | |
| 66 psi | 97 | 97 | 109 | 87 |
| 264 psi | — | — | 88 | — |

Footnotes to Table II:
[1]DC-197: A silicone surfactant supplied by Dow Corning Corp.

We claim:

1. A molded cellular polymer which comprises the reaction product obtained by bringing together in the presence of a blowing agent and a urethane forming catalyst, an organic polyisocyanate, a polyol and extender, said polyol and extender being an active hydrogen composition comprising:
   A. a polyester polyol mixture derived from the reaction of,
      (i) an aromatic polycarboxylic compound containing two or more carboxylic groups; and
      (ii) an excess of at least one polyol having from 2 to 8 hydroxyl groups and an equivalent weight of from about 30 to about 250; and
   B. a primary or secondary amine terminated polyether of greater than 1500 molecular weight and amine functionality of from about 2 to about 8 wherein greater than 50 percent of the active hydrogens are in the form of amine hydrogens, said polyether being present in from about 5 to about 30 percent by weight based on (A) and (B).

2. A molded polymer according to claim 1 wherein said polyisocyanate comprises an aromatic polyisocyanate.

3. A molded polymer according to claim 2 wherein said polyisocyanate comprises polymethylene poly(phenyl isocyanate).

4. A molded polymer according to claim 1 wherein the ratio of equivalents of said polyisocyanate to total active hydrogen equivalents of said (A) and (B) falls within the range of about 0.9:1 to about 1.5:1.

5. A molded polymer according to claim 4 wherein said ratio is from about 0.95:1 to about 1.15:1.

6. A molded polymer according to claim 1 wherein said blowing agent comprises a fluorocarbon blowing agent.

7. A molded polymer according to claim 1 wherein said polyester polyol mixture (A) is derived from the reaction of (i) an aromatic polycarboxylic compound having two to three carboxylic groups and (ii) at least one polyol having from about 2 to about 4 hydroxyl groups and an equivalent weight of from about 30 to about 150 said (ii) being employed in an excess of from about 0.2 mole to about 3 moles per mole of said polycarboxylic compound.

8. A molded polymer according to claim 1 wherein said (B) is a primary amine terminated polyether having a molecular weight of from about 2000 to about 6000 and an amine functionality of from about 2 to about 3.

9. A polymer according to claim 1 wherein said molded cellular polymer is produced by the reaction injection molding process.

10. A molded cellular polymer which comprises the reaction product obtained by bringing together under reaction injection molding conditions:
    1. a polymethylene poly(phenyl isocyanate);
    2. an active hydrogen composition comprising:
       A. a polyester polyol mixture derived from the reaction of,
          (i) an aromatic polycarboxylic compound having two to three carboxylic groups, and
          (ii) at least one polyol having from about 2 to about 4 hydroxyl groups and an equivalent weight of from about 30 to about 150 and employed in an excess of from about 0.2 mole to about 3 moles per mole of said aromatic polycarboxylic compound (i); and
       B. from about 5 to about 30 percent by weight based on the combined weight of (A) and (B) of a primary amine terminated polyether having a molecular weight of from about 2000 to about 6000, an amine functionality of from about 2 to about 3 wherein greater than 50 percent of the active hydrogens are in the form of amine hydrogens;
    3. a fluorocarbon blowing agent; and
    4. a urethane forming catalyst wherein the ratio of equivalents of said polyisocyanate to total active hydrogen equivalents of said (A) and (B) is within the range of about 0.95:1 to 1.15:1.

11. A molded polymer according to claim 10 wherein said (B) has an amine functionality of about 3 and an average molecular weight of about 5000.

12. A molded polymer according to claim 11 wherein said polyester polyol mixture (A) is derived from terephthalic acid and a mixture of glycerine and dipropylene glycol.

13. A molded polymer according to claim 11 wherein said polyol mixture (A) is derived from terephthalic acid and a mixture of glycerine, dipropylene glycol, and the triol prepared from the reaction of glycerine with propylene oxide in the molar proportions of 1 to 3, respectively.

14. An active hydrogen composition comprising a mixture of
    A. a polyester polyol mixture derived from the reaction of,
       (i) an aromatic polycarboxylic compound containing two or more carboxylic groups; and
       (ii) an excess of at least one polyol having from 2 to 8 hydroxyl groups and an equivalent weight of from about 30 to about 250; and
    B. from about 5 to about 30 percent by weight based on the combined weight of (A) and (B) of a primary or secondary amine terminated polyether of greater than 1500 molecular weight and amine functionality of from about 2 to about 8 wherein greater than 50 percent of the active hydrogens are in the form of amine hydrogens.

15. A composition according to claim 14 wherein said polyester polyol mixture (A) is derived from the reaction of (i) an aromatic polycarboxylic compound having two to three carboxylic groups and (ii) at least one polyol having from about 2 to about 4 hydroxyl groups and an equivalent weight of from about 30 to about 150 said (ii) being employed in an excess of from about 0.2 mole to about 3 moles per mole of said polycarboxylic compound.

16. A composition according to claim 15 wherein said (B) is a primary amine terminated polyether having a molecular weight of from about 2000 to about 6000, and an amine functionality of from about 2 to about 3.

17. A composition according to claim 16 wherein said (B) has an amine functionality of about 3 and an average molecular weight of 5000.

18. A composition according to claim 17 wherein said polyester polyol mixture (A) is derived from terephthalic acid and a mixture of glycerine and dipropylene glycol.

19. A composition according to claim 17 wherein said polyester polyol mixture (A) is derived from terephthalic acid and a mixture of glycerine, dipropylene glycol, and the triol prepared from the reaction of glycerine with propylene oxide in the molar proportions of 1 to 3, respectively.

20. A composition according to claim 14 comprising additionally from about 1 to about 30 percent by weight of a fluorocarbon blowing agent.

* * * * *